(12) United States Patent
Mueller et al.

(10) Patent No.: US 9,707,970 B2
(45) Date of Patent: Jul. 18, 2017

(54) METHOD FOR OPERATING A MOTOR VEHICLE, CONTROL DEVICE, AND COMPUTER PROGRAM PRODUCT

(71) Applicant: Robert Bosch GmbH, Stuttgart (DE)

(72) Inventors: Alexander Mueller, Bietigheim (DE); Thomas Kropf, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/055,132

(22) Filed: Feb. 26, 2016

(65) Prior Publication Data

US 2016/0264147 A1 Sep. 15, 2016

(30) Foreign Application Priority Data

Mar. 10, 2015 (DE) .................. 10 2015 204 282

(51) Int. Cl.
*B60W 40/08* (2012.01)
(52) U.S. Cl.
CPC ..... *B60W 40/08* (2013.01); *B60W 2040/0809* (2013.01); *B60W 2540/28* (2013.01); *B60W 2710/20* (2013.01)

(58) Field of Classification Search
CPC .................. H04M 1/72577; B60W 40/08
See application file for complete search history.

(56) References Cited

U.S. PATENT DOCUMENTS

| | | | |
|---|---|---|---|
| 7,327,242 B2 * | 2/2008 | Holloway | B60R 25/24 340/439 |
| 9,440,603 B2 * | 9/2016 | Graham | B60R 16/037 |
| 2013/0200991 A1 * | 8/2013 | Ricci | G08C 19/00 340/4.3 |
| 2014/0306833 A1 * | 10/2014 | Ricci | B60Q 1/00 340/901 |
| 2014/0309806 A1 * | 10/2014 | Ricci | B60Q 1/00 701/1 |
| 2016/0036964 A1 * | 2/2016 | Barfield, Jr. | H04W 4/02 455/418 |
| 2016/0272199 A1 * | 9/2016 | Kawahara | B60W 30/16 |

\* cited by examiner

*Primary Examiner* — Angela Ortiz
*Assistant Examiner* — Alex C Dunn
(74) *Attorney, Agent, or Firm* — Norton Rose Fulbright US LLP; Gerard Messina

(57) ABSTRACT

A method for operating a motor vehicle, and to a control device for carrying out the method and a computer program product having program code for carrying out the method. In order to improve the safety of use of the motor vehicle, it is provided that functions of the motor vehicle are enabled as a function of stored data relating to the driver.

18 Claims, 3 Drawing Sheets

METHOD FOR OPERATING A MOTOR VEHICLE, CONTROL DEVICE, AND COMPUTER PROGRAM PRODUCT

CROSS REFERENCE

The present application claims the benefit under 35 U.S.C. §119 OF German Patent Application No. 102015204282,0 filed Mar. 10, 2015, which is expressly incorporated herein by reference in its entirety.

FIELD

The present invention relates to a method for operating a motor vehicle in which drivers of the motor vehicle are identified. In addition, the present invention relates to a control device for a motor vehicle. In addition, the present invention relates to a computer program product for a motor vehicle, having program code that can be executed by a computer.

BACKGROUND INFORMATION

Methods for operating motor vehicles, as well as control devices and computer program products for motor vehicles, are available. The driver of the motor vehicle is identified in order to check whether the driver is authorized to drive the motor vehicle. The simplest conventional form of the identification of the driver is to check whether the driver has an ignition key that fits the motor vehicle. In addition, or alternatively, the identity of the driver can be checked using biometric measurements, for example a fingerprint or facial features of the driver. The inputting of a code can also be used to identify the driver. If the driver is successfully identified, then the motor vehicle can be started. In this way, unauthorized use of the motor vehicle is prevented.

In particular if facial features of the driver are used for identification, then measured characteristics of the driver can also be used to adapt comfort or safety devices of the motor vehicle to the size of the driver. For example, the seat can be adjusted taking into account bodily dimensions of the driver derived from the position of the face. The position of the head support can also be adapted to the size of the driver. Using conventional methods, control devices and/or computer program products, only passive safety devices of the motor vehicle are thus capable of being adapted to the driver. An improvement of the safety of the operation of the motor vehicle going beyond this is however not realized by the conventional methods, control devices, and/or computer program products.

SUMMARY

According to the present invention, an example method is provided for operating a motor vehicle, in which functions of the motor vehicle are enabled as a function of stored data relating to the identified driver. In addition, according to the present invention, an example control device is provided for a motor vehicle that is set up to execute the method according to the present invention. In addition, according to the present invention, an example computer program product is provided whose computer-executable program code is fashioned to carry out the example method according to the present invention when the program code is executed on a data processing device.

Due to the fact that functions of the motor vehicle are enabled as a function of stored data relating to the identified driver, the functions of the motor vehicle can be adapted to the driver's capacity to operate the motor vehicle and in particular to control it. In this way, the driver is prevented from endangering himself or others, for example due to self-overestimation.

The solution according to the present invention can be further improved through various embodiments, each advantageous in itself and, unless otherwise indicated, capable of being combined arbitrarily with one another. These specific embodiments and their associated advantages are described in the following.

The functions can be driving functions of the motor vehicle. Driving functions are preferably functions of the motor vehicle that influence its travel, preferably directly, i.e., are applied during travel in order to influence travel. The driving functions can be manual driving functions, i.e., functions that are to be executed completely by the driver, partly automatic functions, or fully automatic functions. The partly or fully automatic driving functions are functions that the motor vehicle carries out after manual starting of the function, or fully automatically. The term "partly automatic" can also be expressed as "partly automated" or "highly automated," where these latter two may be regarded as synonymous. In the case of partly automated travel, it can be provided that the driver is responsible at all times for monitoring the functions of the motor vehicle. In the case of highly automated travel, it can be provided that, for driving intervals that may be defined ahead of time, for example highway driving, the driver does not have to monitor the functioning of the vehicle. However, it can be that the driver has to be capable of taking control again of selected, or all, functions of the motor vehicle on short notice, possibly upon prompting by the motor vehicle. Instead of the term "fully automatic," the expression "fully automated" can also be used. In the case of fully automatic operation, the driver does not have to be able to intervene in the functioning of the vehicle. During operation of the motor vehicle, the driver does not even have to be in the motor vehicle.

The data can be data stored ahead of time that are not ascertained from identifying features of the driver used for identification.

Drivers who have little experience with motor vehicles that operate in partly automated or fully automatic fashion can thus be introduced gradually to driving with such motor vehicles. For example, the driving functions can be successively enabled in order to allow the driver to gradually become familiar with partly automated or fully automatic driving. Here, the data can represent the driver's experience with the partly automated or fully automatic driving functions of the motor vehicle. If the driver has no or little experience, then only a few driving functions are enabled. As the driver's experience increases, more driving functions can be enabled. The experience can be use of the enabled driving functions in a period of a few, for example two, hours, or several days or weeks. While the driver accumulates the experience required for the enabling of new driving functions, it can be provided that the driver has to keep his hands on the steering wheel, for example in a "training mode" operating mode in which the driver is using some already-enabled driving functions. If the driver has accumulated adequate experience in training mode, then for example the "expert mode" operating mode can be enabled, with individual or several driving functions, in which the driver can drive for example in no-hands fashion and/or with a higher maximum speed. After a further familiarization time period, in which the driver accumulates further experience with the enabled functions, further driving functions, for example changing lanes by pressing a button, can be enabled. Thus, the functions of the vehicle can be learned step-by-step, and the enabling of the functions can take place in a manner adapted individually to the experience and training success of the driver. In this way, it is possible to train the entire driver assistance functionality available in the vehicle.

In the context of the present invention, the enabling of a driving function can also include the modification of an already-enabled driving function. In the context of the present patent application, the terms "modify" and "enable" may be used in a functionally equivalent, i.e. synonymous, manner. Thus, a modification for example of the function "maximum possible highest speed during partly automated driving" can mean that the maximum possible highest speed is changed, i.e., is modified, from 100 km/h to 150 km/h.

One of the driving functions can be a partly automated or fully automatic change of lane. In a partly automated lane change, the driver initiates the lane change, which the motor vehicle then executes. Given a driver who still has no, or little, experience with partly automated or automatic lane changing, the function can be blocked. Alternatively, the driving function can be enabled to a limited extent, so that the lane change driving function is available only in predefined exceptional cases.

One of the driving functions can be a partly automated or fully automatic passing maneuver. In the case of a partly automated passing maneuver, the driver initiates the passing maneuver, which the motor vehicle then carries out. Given a driver who still has no, or little, experience with partly automated or automatic passing maneuvers, the function can be blocked. Alternatively, the driving function can be enabled to a limited extent, so that the passing maneuver driving function is available only in predefined exceptional cases.

In addition, one of the driving functions can be no-hands driving. In the case of motor vehicles that can be operated in partly automated fashion, and even fully automatically, the driver still has to perform a certain monitoring function. Even if the motor vehicle is capable of no-hands driving, the driver has to be able to recognize malfunctions of the self-steering motor vehicle and to intervene. If it is determined that the driver is monitoring the motor vehicle inadequately, or is inexperienced with no-hands driving, then the no-hands driving function can be blocked, or can be enabled only to a limited extent, for example up to prespecified maximum speeds.

Regardless of whether the motor vehicle is capable of being operated manually, in partly automated fashion, or fully automatically, the function can be a regulation of the maximum available speed. If the driver is for example a beginner, than the maximum speed can be limited to a low value, e.g., 130 km/h. If the driver has acquired some experience then higher speeds, e.g. 150 km/h, may be enabled. The provided highest speed can thus be a manual, partly automated, or fully automatic driving function.

In order to make it possible to provide a structured specification of the motor vehicle functions that are enabled or are to be enabled, the motor vehicle can be operated in different operating modes as a function of the stored data relating to the identified driver, the operating modes each including a plurality of the functions. Alternatively, individual, or a plurality of, selected functions can be enabled based on the data.

The stored data relating to the identified driver can include a capability value that represents the experience and/or capability of the driver in using selected, or all, functions of the motor vehicle. The functions of the motor vehicle can be enabled as a function of the capability value. The capability value can be shared with the driver so that the driver can estimate how well he has mastered the motor vehicle and its functions. In addition, the driver can estimate whether his abilities to operate, in particular drive, the motor vehicle can easily be improved, or have become worse, so that the driver can actively participate in the enabling of the functions.

Alternatively, for individual or for selected functions, separate capability values can be present and/or can be formed in order to make it possible to enable the driving functions in a targeted fashion.

The capability value can be repeatedly updated in order to adapt the enabling of the functions to the development of the experience and/or development of the capabilities of the driver. In particular, the capability value can be updated as a function of whether the driver is using or has used the enabled functions of the motor vehicle in accordance with predefined requirements. In addition, the capability value can be updated through external requirements.

Thus, as the driver's experience with the functions of the motor vehicle increases, further functions can be enabled when the capability value is adapted to the increasing experience. If however the capacity of the driver to use the functions of the motor vehicle decreases over time, then this degradation of the capacity can be represented by the capability value, so that already-enabled functions can be blocked again. For example, it can occur that the driver uses no-hands driving for a long time, but over the course of time becomes less attentive and is no longer paying attention to traffic, or is doing so inadequately, so that he no longer meets the requirement of monitoring the traffic situation. The motor vehicle can monitor the driver, for example using a camera, and can determine whether the driver is monitoring the functions, and in particular whether he is using the functions in accordance with requirements. If this is not the case, the capability value is degraded, which can have the result that fewer functions are enabled.

The capability value can in particular represent whether the driver is adequately monitoring traffic, i.e., whether the driver is looking in the direction of travel during travel. If, during travel and in particular during partly automated or fully automatic travel, the driver's view is not directed toward traffic, this can be represented by a poor capability value. The capability value can also represent whether the driver is initiating, or himself carrying out, a safe lane change and/or passing maneuver. If the lane change and/or passing maneuver are not possible or are not safely possible, once or also repeatedly, and the motor vehicle even has to terminate the process, then this can be represented by a poor capability value. Risky driving, in particular inappropriate speeds, can also be represented by the capability value. In the case of manual driving, following too closely can also negatively influence the capability value.

The capability value can represent all named functions, i.e., for example traffic monitoring, initiation of lane changes and/or passing maneuvers, risky or inappropriate speed, and/or following too closely, or other functions, in particular functions relevant to driving safety.

The functions can be not only the maximum speed, but also the speed specified, possibly adaptively, by a cruise control. Further functions can include partly automated or fully automatic lane changing and/or passing maneuvers, partly automated or fully automatic driving during traffic congestion by a traffic congestion assistant, or further functions.

If the identity of the driver is still unknown, so that stored data relating to the driver are not present, then when using the motor vehicle for the first time the previously unknown driver can register with the motor vehicle. For example, in the case of a previously unknown driver only a basic functionality of the motor vehicle can be enabled, including for example a low maximum speed and/or low partly automated or fully automatic functionality of the motor vehicle. Alternatively or in addition, a capability value of the driver can be provided on the basis of which the functions of the motor vehicle can be enabled. For example, the driver can input the capability value. Alternatively, a data memory containing data representing the capability value can be read out. The data memory can for example be a data memory of an identification document such as a driver's license, or of a key.

In the context of the present invention, a function can also be enabled only in partial steps, or successively. The partial steps can be predefined. The enabling in partial steps can take place after preconditions are met, e.g., after a set time interval or after training of a particular capability level. Thus, the function "partly automated driving" can first be enabled as "partly automated driving up to 30 km/h," and then, after a specified time, e.g., four hours, can be enabled as "partly automated driving up to 60 km/h," and then, again after a specified time, as "partly automated driving up to 120 km/h," and then, e.g., again after a specified time, can be fully enabled.

In addition, according to the present invention, a motor vehicle can be provided that is capable of being operated manually, in partly automated fashion, or fully automatically, the motor vehicle having a control device according to the present invention that can contain the computer program product according to the present invention in executable fashion.

The control device can be understood as an electrical apparatus, for example a control apparatus, in particular a control apparatus for a motor vehicle, that processes sensor signals and outputs control signals as a function thereof. The motor vehicle can be a motor vehicle designed for roadway travel, such as a passenger car or a truck or a two-wheeled vehicle. In addition, the motor vehicle can be an aircraft, for example an airplane.

BRIEF DESCRIPTION OF THE DRAWINGS

Exemplary embodiments of the present invention are explained in more detail below on the basis of the figures.

DETAILED DESCRIPTION OF EXAMPLE EMBODIMENTS

In the following, the present invention is explained in exemplary fashion on the basis of specific embodiments with reference to the figures. The various features of the specific embodiments can be combined independently of one another, as was already explained in relation to the individual advantageous embodiments.

First, the structure and function of an example method according to the present invention for operating a motor vehicle is described with reference to the exemplary embodiment of FIG. 1.

Figure 1:
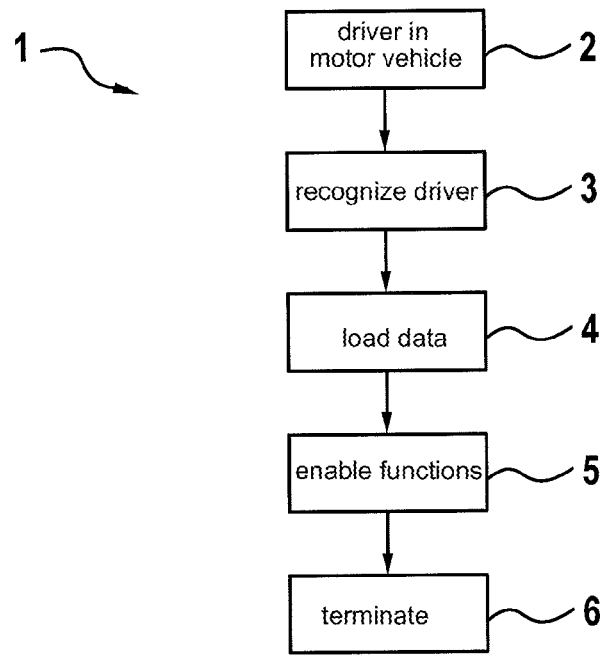
FIG. 1 shows a schematic representation of an exemplary embodiment of the method according to the present invention.

FIG. 1 shows method 1 schematically, as a flow diagram. Method 1 starts with a first method step 2. In method step 2 it is for example recognized that a driver has gotten into a motor vehicle.

Method step 2 is followed by method step 3, in which an attempt is made to recognize the driver. If the driver has been recognized, for example because the driver has already driven this motor vehicle in the past, then in the following method step 4 previously stored data relating to the identified driver are loaded where possible.

Based on the data loaded in method step 4 relating to the identified driver, in method step 5, which follows method step 4, functions of the motor vehicle are enabled. The functions can in particular be driving functions of the motor vehicle that are available in the case of manual, partly automated, and/or fully automatic operation of the motor vehicle. For example, the available maximum speed of the motor vehicle can be limited based on the data. Partly automated or automatic driving functions, such as change of lane or passing maneuvers, or also no-hands driving, can be enabled based on the data.

The method terminates in method step 6. For example, travel with the enabled functions can be started.

Figure 2:
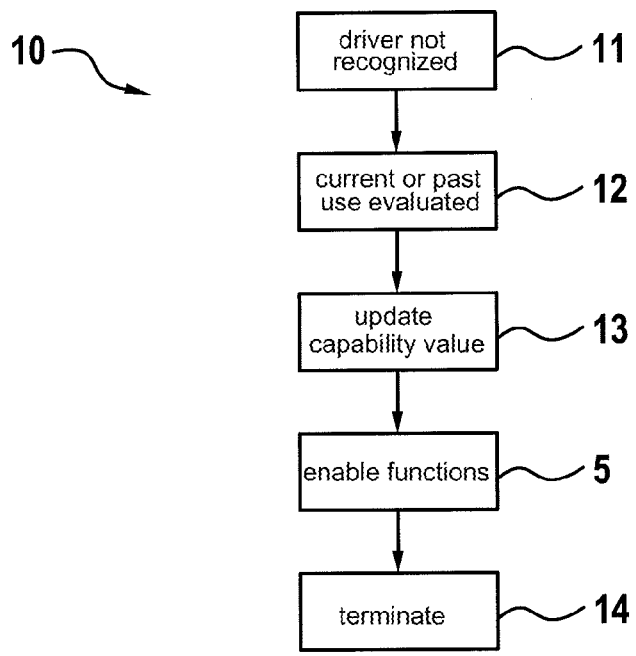
FIG. 2 shows an exemplary embodiment of a partial method according to the present invention.

FIG. 2 shows an exemplary embodiment of a partial method according to the present invention of method 1. For elements that correspond in their structure and/or function to the elements of the exemplary embodiment of FIG. 1, the same reference characters are used. For brevity, only the differences from the exemplary embodiment of FIG. 1 are described.

FIG. 2 shows a partial method 10 schematically as a flow diagram. Partial method 10 can be part of method 1, or can be advantageous separately from method 1, and carried out separately. In partial method 10, data associated with the driver, and in particular a capability value, are updated.

Method 10 starts with method step 11. For example, method 10 can be started during travel of the motor vehicle, i.e., following method step 6 of method 1. Alternatively, method 10 can be carried out during the execution of method step 4, or during a resting state of the motor vehicle.

In the exemplary embodiment of FIG. 2, method step 11 is followed by method step 12, in which the current or past use of the motor vehicle, or the use of its functions, is evaluated and is compared for example with target values. As a function of the evaluation of method step 12, in the following method step 13 the stored data relating to the driver, in particular the capability value, are updated. If the use of the motor vehicle, or the use of the currently enabled functions, corresponds to the target values, then the data, in particular the capability value, can be left unmodified. If the evaluation of method step 12 yields the result that the driver is not making appropriate use of the functions of the motor vehicle, then the updating of the data can result in a worsening of the capability value. If the driver is using the functions of the vehicle better than expected, then in method step 13 the data can in particular be updated by improving the capability value.

Method step 13 can be followed by method step 5, in which the functions are enabled based on the data. Method step 5 can be followed by method step 14, in which partial method 10 is terminated. If warranted, method 10 can be started again in method step 14, if the stored data relating to the driver are to be repeatedly, or even continuously, updated.

Method 1 can be executed together with method 10 during the travel of the motor vehicle, so that current events during travel can be adapted to a change in the enabling of the functions on the basis of the manner of driving by the driver.

Figure 3:
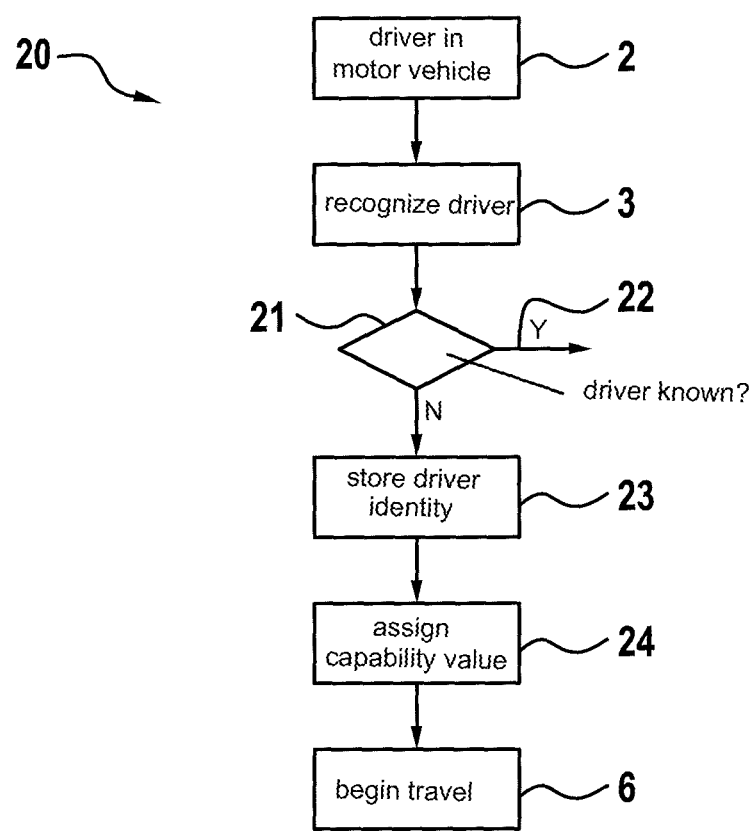
FIG. 3 shows an exemplary embodiment of a further partial method according to the present invention.

FIG. 3 shows an exemplary embodiment of a further partial method, schematically as a flow diagram. For elements whose structure and/or function correspond to the elements of the exemplary embodiments of FIGS. 1 and 2, the same reference characters are used. For brevity, in the following only the differences from the exemplary embodiments of FIGS. 1 and 2 are described. In partial method 20, it is ascertained whether the driver has driven the motor vehicle before, or is a new driver. Partial method 20 can be a part of method 1, and can be advantageous and executed not only with method 1, but optionally also with partial method 10, or separately from partial method 10 and even from method 1.

Method 20 starts with method step 2, in which it is recognized that a driver has gotten into the vehicle. In method 20, method step 2 is followed by method step 3, in which an attempt is made to recognize the driver. In the following method step 21, which can follow method step 2 of method 1, it is ascertained whether the driver is known. If the driver is known, then method step 21 can be followed by method step 4, which is represented by arrow 22.

However, if the driver is unknown up to now, then method step 21 can be followed by method step 23, in which the identity of the driver, and in particular the driver's identifying features, are stored. The identity of the driver does not have to include personal data relating to the driver; it is sufficient only to retain data required for the identification of the driver, for example identification features.

In the following method step 24, data are assigned to the driver. In particular, a capability value can be assigned to the driver. In particular in the case of a new driver, the capability value can represent that up to now this driver has had no experience with the functions of the motor vehicle. Alternatively or in addition, data, and in particular at least one capability value, can be provided that represent the driver's experiences with the functions of the motor vehicle. For example, the driver may previously have driven a comparable motor vehicle, his capability value having changed as a result. The provided data can be provided by the driver or from an external source.

Method step 24 can be followed by method step 6, and travel with the vehicle can begin. Alternatively, partial method 30 can be terminated after method step 24, or can be restarted in order to store additional drivers with associated data.

Figure 4:
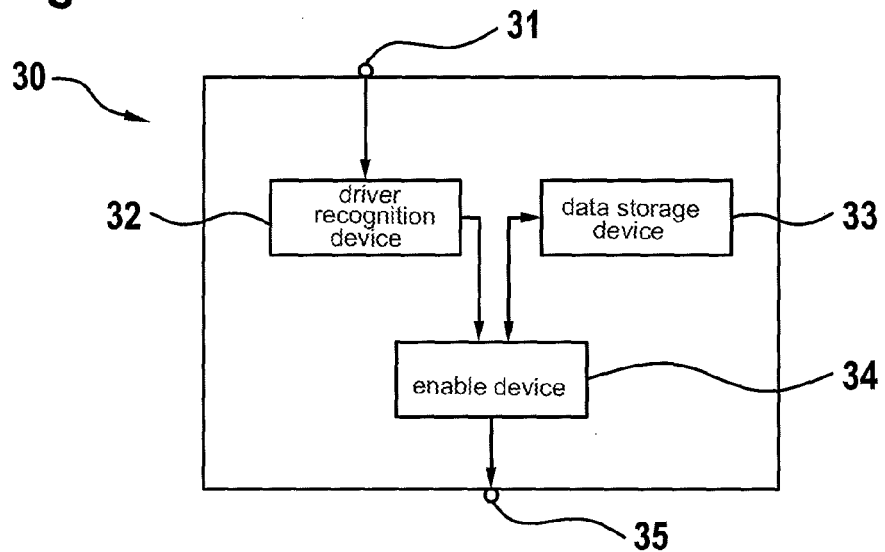
FIG. 4 shows an exemplary embodiment of a control device according to the present invention.

FIG. 4 shows an exemplary embodiment of a control device 30 for a motor vehicle according to the present invention. Control device 30 is preferably fashioned to carry out a method 1 according to the present invention, and optionally also at least one of partial methods 10, 20, during operation. For example, control device 30 is a control device for a motor vehicle that receives sensor signals, processes them, and outputs control signals as a function of the sensor signals.

In order to enable reception of the sensor signals, control device 30 has a signal input 31. In particular, the sensor signals can be representative of the identity of the driver. For example, the sensor signals can contain a code inputted by the driver or can contain an identification sequence provided by a data carrier. Preferably, the identity of the driver is however ascertained via biometric measurements, for example by signals from a camera directed toward the face of the driver. Thus, signal input 31 can be an image signal input that can be connected to a camera of the motor vehicle so as to transmit an image signal.

Control device 30 can have a driver recognition device 32 that is connected to signal input 31, preferably so as to transmit a signal. On the basis of the signals provided at signal input 31, driver recognition device 32 can ascertain whether the driver has used the vehicle before, and what the identity of the driver is.

In addition, control device 30 has a data storage device 33 in which data can be stored that can be assigned to drivers. Data storage device 33 can be connected to driver recognition device 32 so as to be capable of transmitting data. In the exemplary embodiment of FIG. 4, however, data storage device 33 is connected to an enable device 34 of control device 30 so as to be capable of transmitting data. Driver recognition device 32 is also connected to enable device 34 so as to be capable of transmitting data. Optionally, driver recognition device 32 can also be connected to enable device 34 via data storage device 33 so as to be capable of transmitting data.

Enable device 34 is fashioned to enable functions of the motor vehicle based on the stored data in data storage device 33 relating to the identified driver. In order to make it possible to enable the functions of the motor vehicle, control device 30 has a signal output 35 that is connected to enable device 34 so as to be capable of receiving signals, and that can be connected to other devices of the motor vehicle, for example additional control devices, so as to be capable of transmitting control signals.

Control device 30 thus has at least enable device 34, in order to be able to execute the method according to the present invention. Driver recognition device 32 and data storage device 33 can be provided optionally and in particular separately from control device 30, or as an integral component of control device 30.

Figure 5:
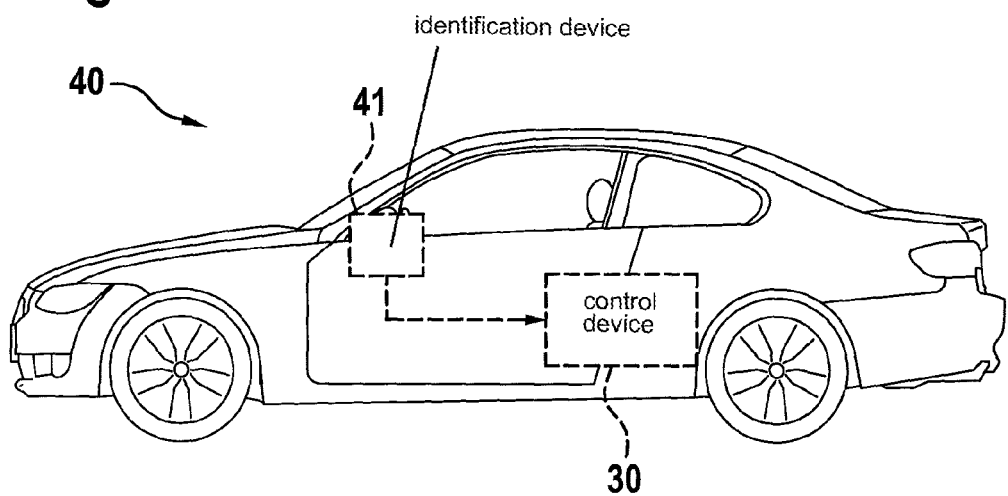
FIG. 5 shows an exemplary embodiment of a motor vehicle according to the present invention.

FIG. 5 shows an exemplary embodiment of a motor vehicle 40 according to the present invention, schematically in a side view. Motor vehicle 40 has control device 30, set up to execute the method according to the present invention. Signal input 31 (not shown in FIG. 5 for clarity) of control device 30 is connected to an identification device 41 of motor vehicle 40 so as to be capable of transmitting signals. Identification device 41 is fashioned to produce and to output signals that enable an identification of the driver. For example, identification device 41 is a camera that images the face of the driver.

Although the present invention has been illustrated and described in detail through preferred exemplary embodiments, the present invention is not limited by the disclosed examples, and other variations can be derived therefrom by someone skilled in the art without departing from the scope of protection of the present invention.

What is claimed is:

1. A method for operating a motor vehicle, comprising:
   identifying, by a control device of the motor vehicle based on an output from a sensor of the motor vehicle, a driver; and
   at least one of enabling or modifying, by the control device outputting a control signal to at least one other device of the vehicle, at least one function of the motor vehicle as a function of stored data relating to the identified driver, the stored data including a capability value representing a capability of the identified driver when using the at least one function, the at least one function being enabled or modified as a function of the capability value.

2. The method as recited in claim 1, wherein the at least one function includes a driving function of the motor vehicle.

3. The method as recited in claim 2, wherein the at least one function includes a partly automated or fully automatic change of lane.

4. The method as recited in claim 2, wherein the at least one function includes a partly automated or fully automatic passing maneuver.

5. The method as recited in claim 2, wherein the at least one function includes no-hands driving.

6. The method as recited in claim 2, wherein the at least one function includes a limiting of the maximum speed of the motor vehicle.

7. The method as recited in claim 1, wherein the motor vehicle is operated in different operating modes as a function of the stored data relating to the identified driver, and the operating modes each include a plurality of the at least one function.

8. The method as recited in claim 1, wherein the capability value is repeatedly updated.

9. The method as recited in claim 1, wherein the capability value is updated as a function of whether the driver has used the enabled or modified functions of the motor vehicle in accordance with predefined requirements.

10. A method for operating a motor vehicle, comprising:
identifying, by a control device of the motor vehicle based on an output from a sensor of the motor vehicle, a driver; and
at least one of enabling or modifying, by the control device outputting a control signal to at least one other device of the vehicle, a function of the motor vehicle as a function of stored data relating to the identified driver, wherein the function of the motor vehicle is enabled in partial steps.

11. The method as recited in claim 10, wherein the stored data relating to the identified driver includes a capability value representing a capability of the identified driver when using the at least one function, the at least one function being enabled or modified as a function of the capability value.

12. A control device for a motor vehicle, the control device configured to:
identify a driver; and
at least one of enable or modify at least one function of the motor vehicle as a function of stored data relating to the identified driver, the stored data including a capability value representing a capability of the identified driver when using the at least one function, the at least one function being enabled or modified as a function of the capability value.

13. A non-transitory machine-readable storage medium having program instructions, which when executed by a data processing device cause the data processing device to perform a method, the method comprising:
identifying a driver; and
at least one of enabling or modifying at least one function of the motor vehicle as a function of stored data relating to the identified driver, the stored data including a capability value representing a capability of the identified driver when using the at least one function, the at least one function being enabled or modified as a function of the capability value.

14. The non-transitory machine-readable storage medium of claim 13, wherein the driver is identified based on an output from a sensor of the motor vehicle.

15. The non-transitory machine-readable storage medium of claim 13, wherein the at least one function is enabled or modified by outputting a control signal to at least one other device of the motor vehicle.

16. The control device of claim 12, wherein the driver is identified based on an output from a sensor of the motor vehicle.

17. The control device of claim 12, wherein the at least one function is enabled or modified by outputting a control signal to at least one other device of the motor vehicle.

18. The method as recited in claim 1, wherein the sensor is a camera.

* * * * *